United States Patent [19]
Gaffney et al.

[11] Patent Number: 5,912,967
[45] Date of Patent: Jun. 15, 1999

[54] SPEAKER-PHONE ASSEMBLY AND METHOD

[75] Inventors: David G. Gaffney, Evanston; Edward B. Endejan, Gurnee, both of Ill.; Robert F. Young, Santa Cruz, Calif.

[73] Assignee: 3COM Corp., Mount Prospect, Ill.

[21] Appl. No.: 08/926,752

[22] Filed: Sep. 11, 1997

[51] Int. Cl.⁶ .................................................. H04M 1/00
[52] U.S. Cl. .......................................... 379/420; 379/428
[58] Field of Search ...................... 379/420, 433, 379/428, 435, 436; 381/86, 332, 386, 389

[56] References Cited

U.S. PATENT DOCUMENTS

| | | |
|---|---|---|
| 2,230,104 | 1/1941 | Bostwick . |
| 2,763,730 | 9/1956 | Paull et al. . |
| 2,976,373 | 3/1961 | Uchida . |
| 3,069,508 | 12/1962 | Boeryd et al. . |
| 4,078,155 | 3/1978 | Botros et al. . |
| 4,434,507 | 2/1984 | Thomas . |
| 4,436,966 | 3/1984 | Botros . |
| 4,620,317 | 10/1986 | Anderson . |
| 4,831,656 | 5/1989 | Southern et al. . |
| 5,138,651 | 8/1992 | Sudo . |
| 5,369,701 | 11/1994 | McAteer et al. ........................ 379/420 |

*Primary Examiner*—Jack Chiang
*Attorney, Agent, or Firm*—Frank C. Nicholas; Michael D. Gannon

[57] ABSTRACT

A speaker-phone assembly includes a speaker assembly, a microphone and an outer shell. The speaker assembly includes an upper lid, a bottom cup, and a speaker. A gasket may be positioned between the lid and cup, a C-shaped gasket may be positioned around the rim of the speaker to isolate the speaker from the lid. A plurality of brackets including gaskets extend from the cup and are received by posts extending from an interior portion of the outer shell to isolate the speaker assembly from the outer shell. A microphone stand having an inner region connected to an outer region by at least one web portion isolates the microphone. The microphone is positioned upright and in a plane substantially perpendicular to a plane which includes a rim of the speaker.

30 Claims, 8 Drawing Sheets

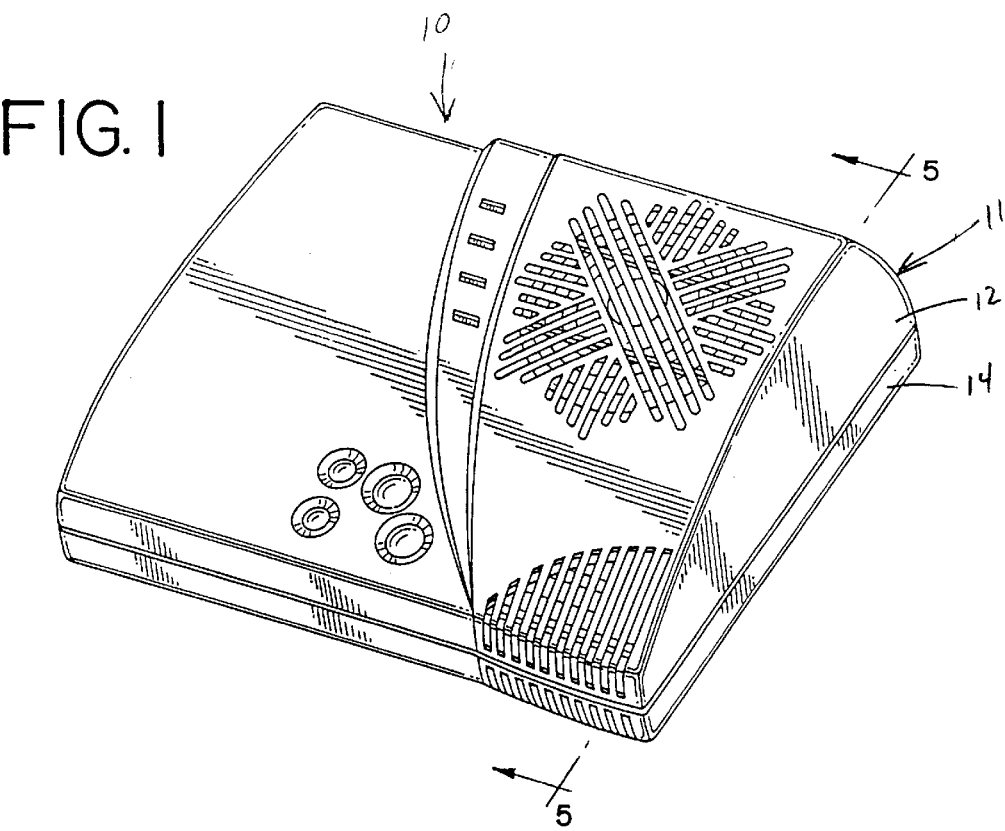
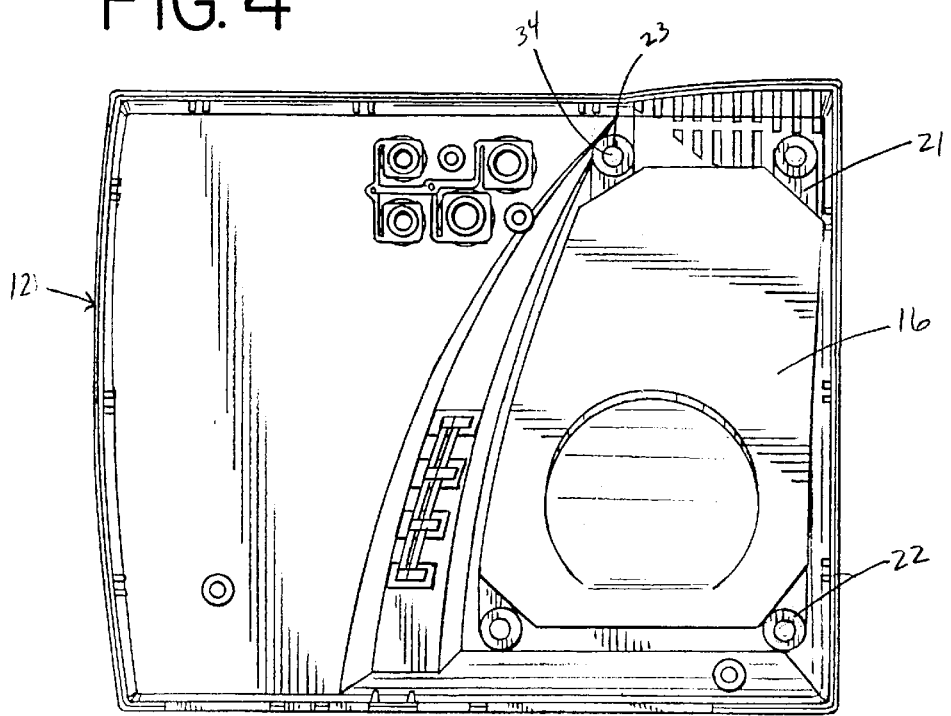

FIG. 3
FIG. 2
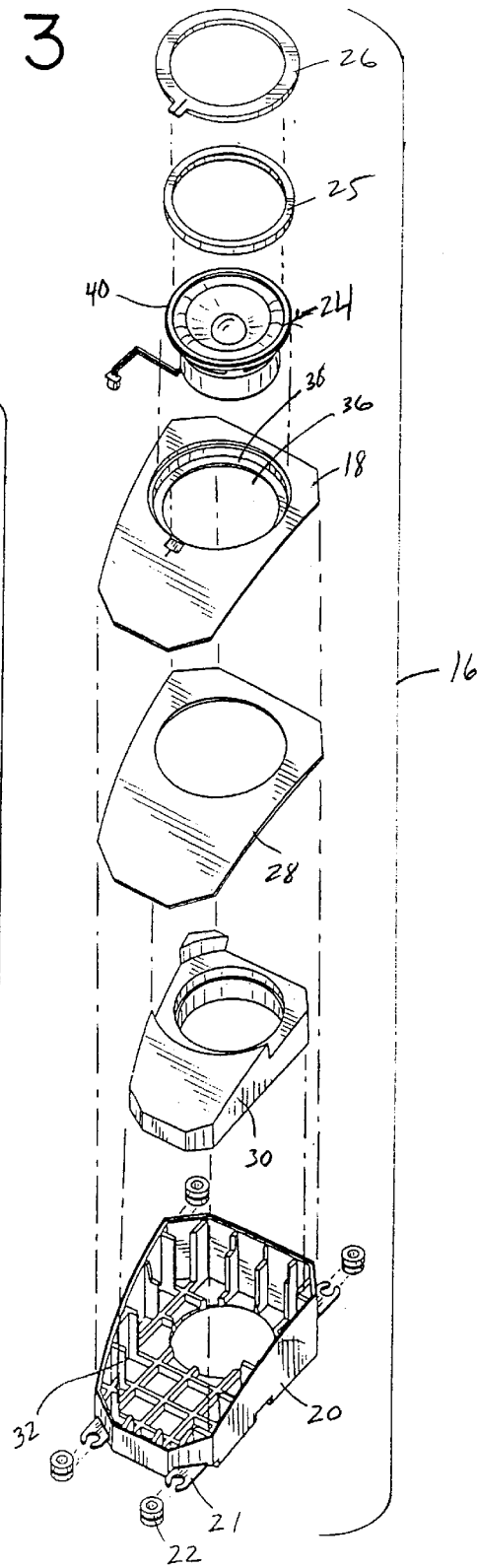
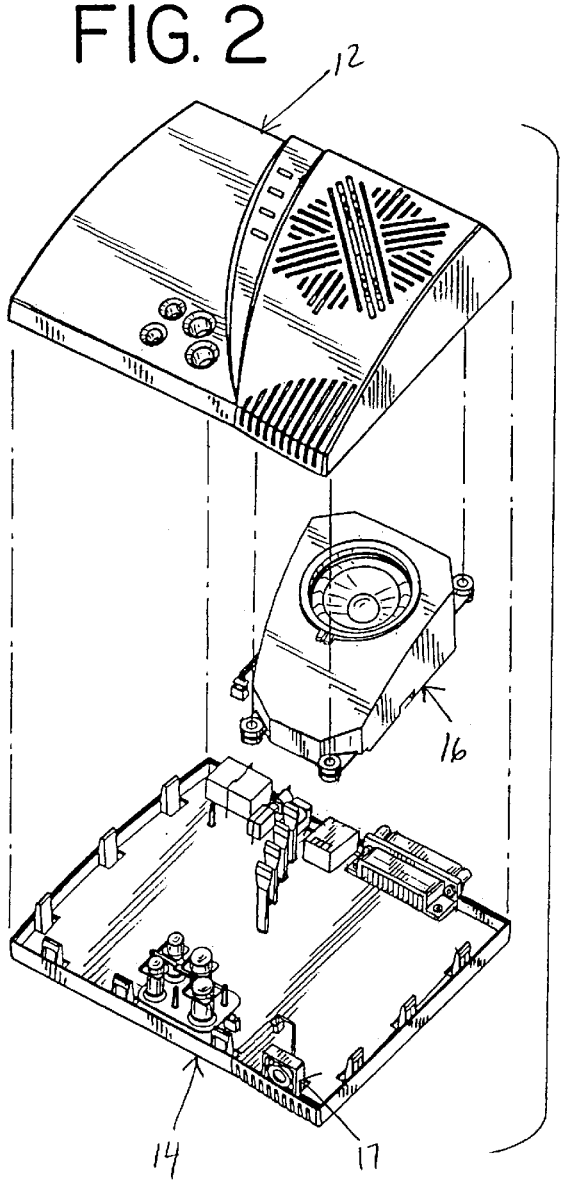

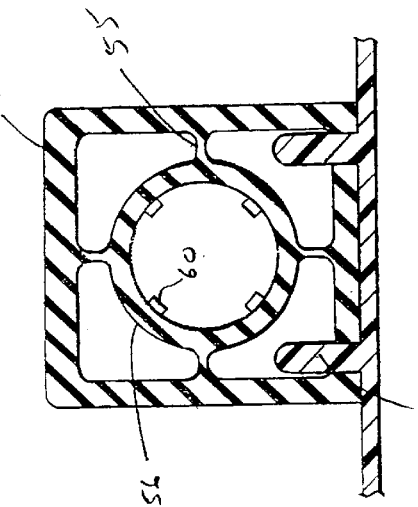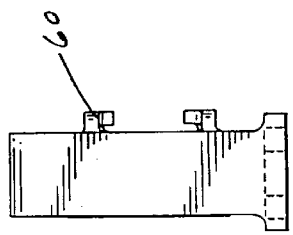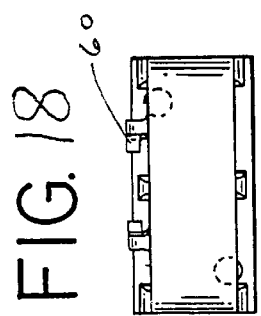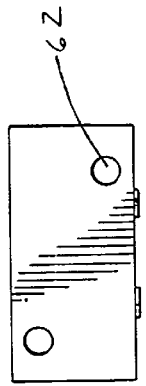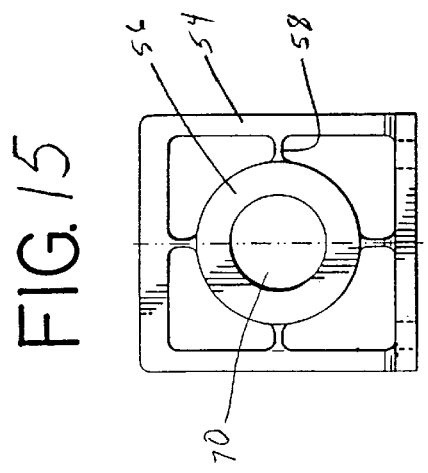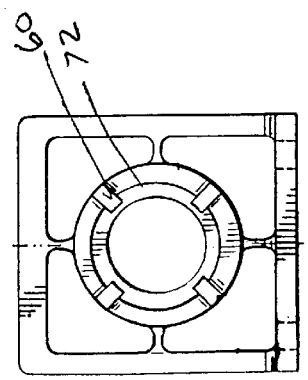

SPEAKER-PHONE ASSEMBLY AND METHOD

FIELD OF THE INVENTION

The invention generally relates to an improved speaker-phone assembly and method of operating. More specifically, the invention relates to a method of isolating and orienting the speaker and microphone to reduce vibration and feedback.

BACKGROUND OF THE INVENTION

In general, speakers and microphones are mounted within close proximity of each other within the outer casing of the speaker-phone assembly. Due to the proximity of the speaker to the microphone and the inadequate mounting of the speaker and/or microphone, feedback may occur with full duplex speaker-phones. Typically, vibrations from the speaker travel along the outer casing and are picked up by the microphone causing the feedback through the speaker. Digital signal processing and echo cancellation programs when used with full duplex speaker-phones may reduce this feedback to some extent, however, it would be desirable to have a speaker-phone design which would reduce the need for echo cancellation, which can be expensive. Accordingly, it would also be desirable to isolate the speaker and microphone to reduce vibrations and ensure minimum feedback.

SUMMARY OF THE INVENTION

One aspect of the invention provides a speaker assembly comprising an upper lid including an opening and recessed ledge around the perimeter of the opening, a bottom cup attached to the upper lid, a speaker including a rim formed around the perimeter of the speaker, a speaker gasket attached to the speaker rim and contacting the ledge, and a plurality of brackets extending from the bottom cup including a gasket attached to each bracket for isolating the speaker from an outer shell of the speaker-phone. The speaker gasket preferably is a C-shaped gasket which may be fitted over the rim of the speaker to isolate the speaker from the upper lid. The bracket gaskets may be barrel-type gaskets. Both the C-shaped gaskets and barrel-type gaskets may preferably be made of a resilient damping material.

Another aspect of the invention provides for a speaker-phone assembly comprising an outer shell including a plurality of posts, and a speaker assembly including a plurality of brackets. The gaskets include openings which receive the posts. The posts may preferably be ultra-sonically welded over the gaskets.

Another aspect of the invention provides for a method of isolating a speaker within a speaker-phone assembly. A speaker assembly including a plurality of brackets are provided. A gasket having an opening formed therein is attached to each of the brackets. An outer shell including a plurality of interior posts is also provided. The posts are inserted into the openings formed in the bracket gaskets. The posts are ultra-sonically welded to secure the speaker assembly to the outer shell. A thin foam gasket may be positioned between a top side of the lid and an interior wall of the outer housing. The method further provides reducing vibration to a microphone. A microphone stand includes an inner portion isolated from and connected to an outer portion by at least one narrow web portion. A microphone is positioned within an opening formed in the inner portion. Vibrations to the microphone are dampened by directing any vibrations from the outer portion through the narrow web portion.

Another aspect of the invention provides for a speaker-phone assembly comprising a speaker assembly positioned within an outer shell, a speaker positioned in the speaker assembly, a microphone stand positioned on a bottom side of the outer shell, and a microphone positioned in the stand and having a face oriented in a plane substantially perpendicular to a line extending radially outward from the speaker. The speaker-phone assembly comprises an outer shell including a plurality of posts, and a speaker assembly including a plurality of brackets. The gaskets include openings which receive the posts. The microphone stand may preferably comprise an outer position including a base having at least one opening for receiving a peg, an inner portion having an opening for receiving a microphone, and at least one web portion to connect and isolate the inner portion from the outer portion. The microphone stand may preferably be made from a soft resilient dampening material.

Another aspect of the invention provides for a method of reducing vibration to a microphone. A microphone stand includes an inner portion isolated from and connected to an outer portion by at least one narrow web portion. A microphone is positioned within an opening formed in the inner portion. Vibrations to the microphone are dampened by directing any vibrations from the outer portion through the narrow web portion.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 1 is a perspective view of a preferred embodiment of the outer shell of the speaker-phone assembly;

FIG. 2 is an exploded view of the speaker-phone assembly of FIG. 1 including speaker assembly and upper and lower shell;

FIG. 3 is an exploded view of the speaker assembly of FIG. 2;

FIG. 4 is a bottom view of the upper shell and speaker cup;

FIG. 15 is a front view of the microphone stand of FIG. 14;

FIG. 16 is a back view of the microphone stand of FIG. 14;

FIG. 17 is a side view of the microphone stand of FIG. 14;

FIG. 18 is a top view of the microphone stand of FIG. 14;

FIG. 19 is a bottom view of the microphone stand of FIG. 14; and

FIG. 20 is a sectional view taken along line 8—8 of FIG. 14.

DETAILED DESCRIPTION OF THE PRESENTLY PREFERRED EMBODIMENTS

Figure 5:
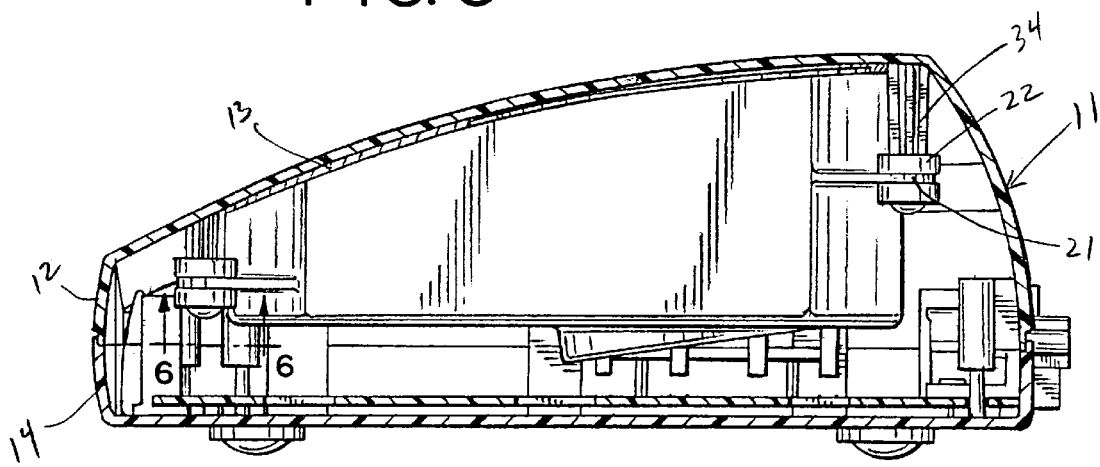
FIG. 5 is a sectional view of the speaker-phone assembly taken along line 5—5 of FIG. 1.

Referring to FIGS. 1–3, a preferred embodiment of a speaker-phone assembly 10 preferably includes an outer shell 11, preferably including an upper shell 12 and bottom shell 14, a speaker assembly 16 and a microphone assembly 17. In the embodiment shown in FIG. 3, the speaker assembly 16 may preferably include an upper lid 18, a bottom cup 20 with brackets 21, bracket gaskets 22, speaker 24, speaker gasket 25, cap 26, gasket 28, and foam insert 30. The speaker assembly 16 is designed to isolate the parts of the speaker assembly from each other and from the outer shell of the speaker-phone. The bottom cup 20 is preferably made of a rigid material, including plastic. Ribbing 32 is preferably formed in an interior section of the bottom cup 20 to provide stiffness and strength around the entire circumference of the cup 20. The speaker assembly 16 preferably includes brackets 21 for mounting the speaker assembly 16 to the outer shell 11.

As shown in the embodiment of FIGS. 1–3, one or more brackets 21 may extend from the speaker assembly 16. The brackets 21 preferably have a thickness which is as thin as structurally possible to support the speaker assembly 16 on posts within the outer shell 11. This will aid in reducing vibrations from the speaker assembly 16. In the embodiment shown, the brackets 21 preferably extend from corners of the bottom cup 20. The brackets may alternatively extend from other locations of the speaker assembly, including the upper lid 18. Bracket gaskets 22 fit within the brackets 21. The bracket gaskets 22 may preferably be barrel-type gaskets made of a resilient dampening material, including, for example, Santoprene, which is available from Monsanto, or other elastomers.

Figure 6:
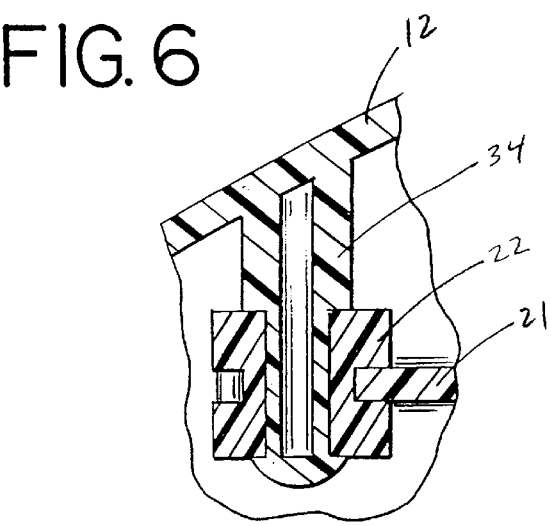
FIG. 6 is an enlarged sectional view taken along line 6—6 of FIG. 5.
Figure 7:
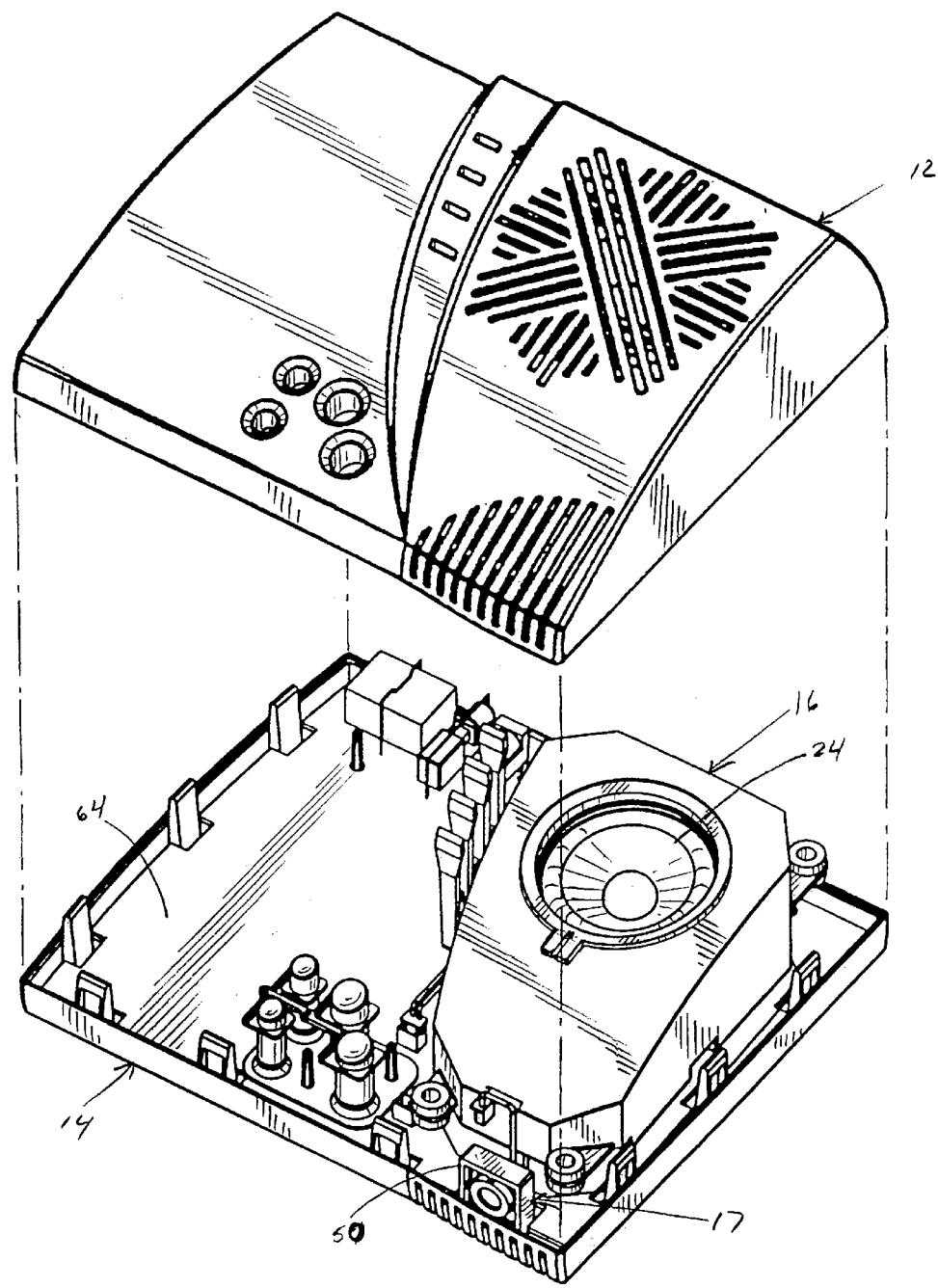
FIG. 7 is an exploded perspective view of a preferred embodiment of a speaker-phone assembly showing the speaker in a preferred alignment with the upright microphone.
Figure 8:
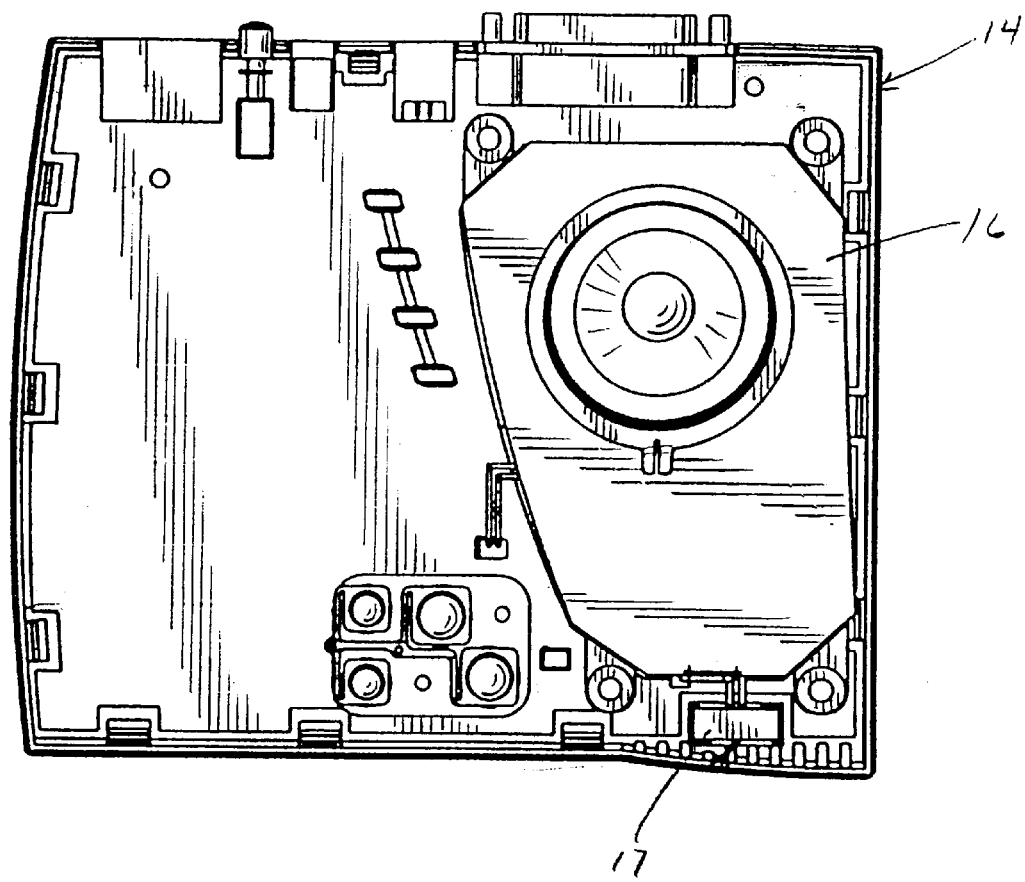
FIG. 8 is a top view of a preferred embodiment of the speaker and microphone positioned on the bottom shell.
Figure 9:
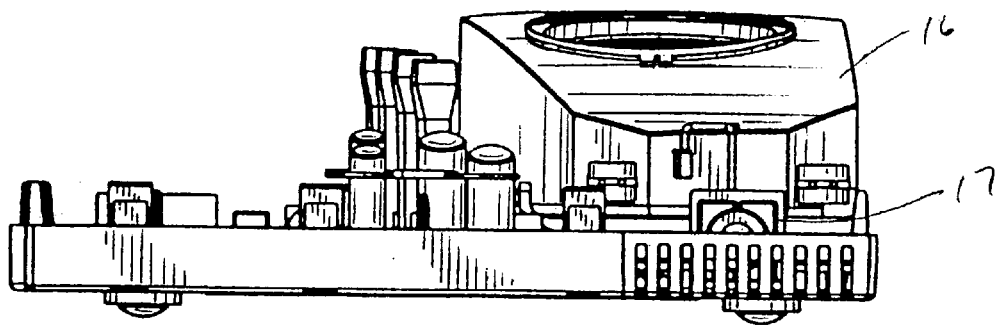
FIG. 9 is a front view of the embodiment of FIG. 8
Figure 10:
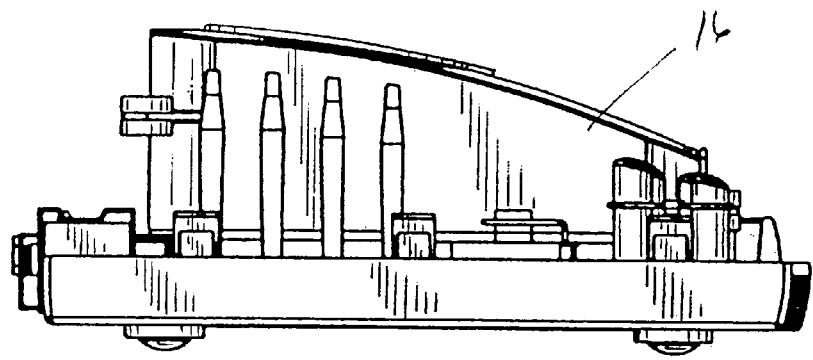
FIG. 10 is a left side view of the embodiment of FIG. 8.
Figure 11:
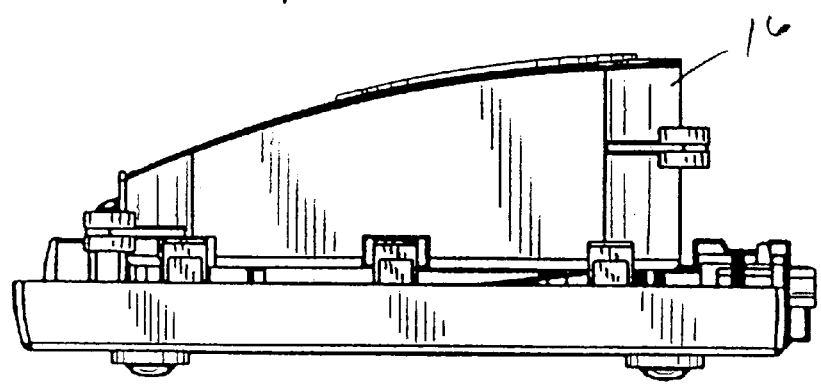
FIG. 11 is a right side view of the embodiment of FIG. 8.
Figure 12:
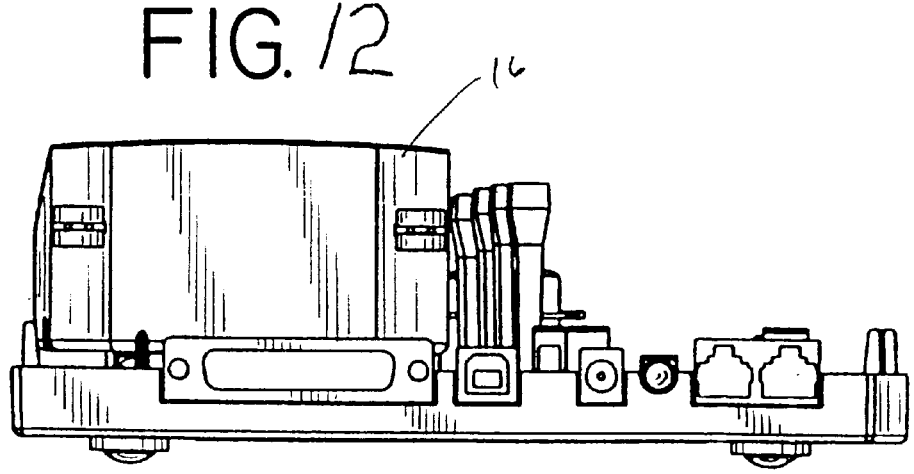
FIG. 12 is a back view of the embodiment of FIG. 8.

As shown in FIGS. 4–6, the bracket gaskets 22 include openings 23 which are received on posts 34 formed in the interior of the outer shell 11. In the embodiment shown in FIGS. 5–6, there are four posts 34, which are formed in the upper shell 12. The speaker assembly 16 is otherwise isolated from the upper shell 12 and bottom shell 14 to reduce vibrations from the speaker 24 to the microphone 52. It may, however, be desirable to include a thin foam gasket 13 which form fits to a top side of the lid 18 to provide a tight fit between the speaker assembly 16, and the upper shell 12. In the embodiment shown in FIG. 5, the foam gasket 13 may, for example, have a thickness of about 1/16 of an inch. Preferably, the posts 34 are ultra-sonically welded and melt over the bracket gaskets 22 to secure the speaker assembly 16 in position.

Referring to FIG. 3, the foam insert 30, which conforms to the shape of the cup 20, may be placed into the cup 20 to take up the empty space and further dampens any vibrations. A gasket 28, which conforms to the shape of the lid 18 may then preferably be placed over the foam insert 30 or applied to the bottom of the lid 18 with adhesive. The gasket 28 further dampens vibration from the speaker. The lid 18 may then be fitted onto and attached to the cup 20 by any conventional means, including screws. Preferably, the lid 18 and cup 20 are ultra-sonically welded together. The speaker 24 may be inserted in the opening 36 formed in the lid 18. Preferably, around the perimeter of the opening 36, a recessed ledge 38 is formed which supports a rim 40 of the speaker 24. In the embodiment shown, a speaker gasket 25 is preferably placed over the rim 40 to contact with the ledge 38. The speaker gasket 25 may preferably be a C-shaped gasket, and may be made of, for example, Santoprene or other dampening material. A cap 26 may then be ultra-sonically welded to the lid 18 to retain the speaker 24 within the speaker assembly 16.

Figure 14:
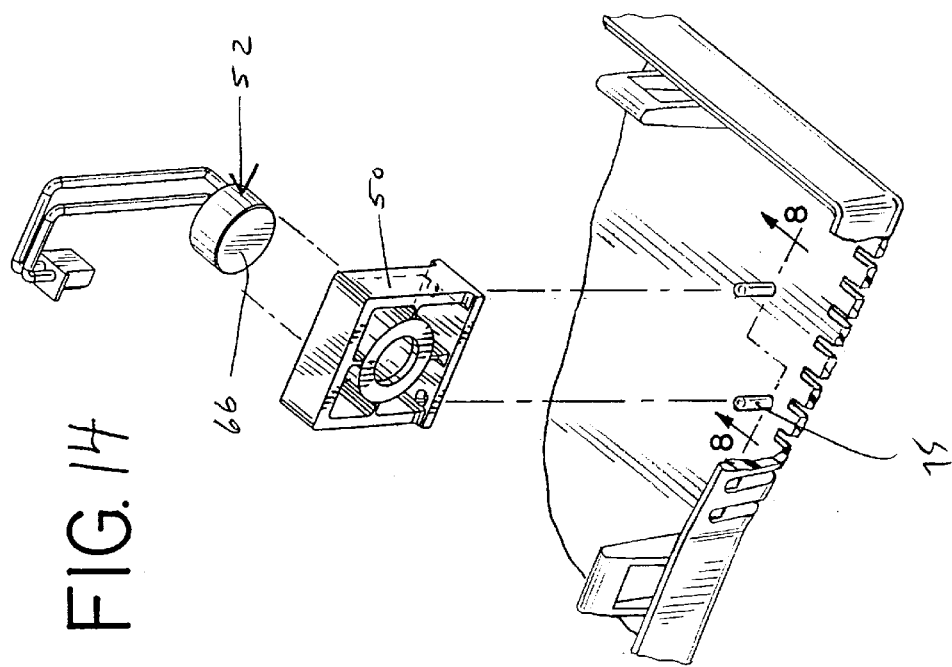
FIG. 14 is an enlarged exploded perspective view of the microphone stand, microphone and the portion of the bottom shell.
Figure 13:
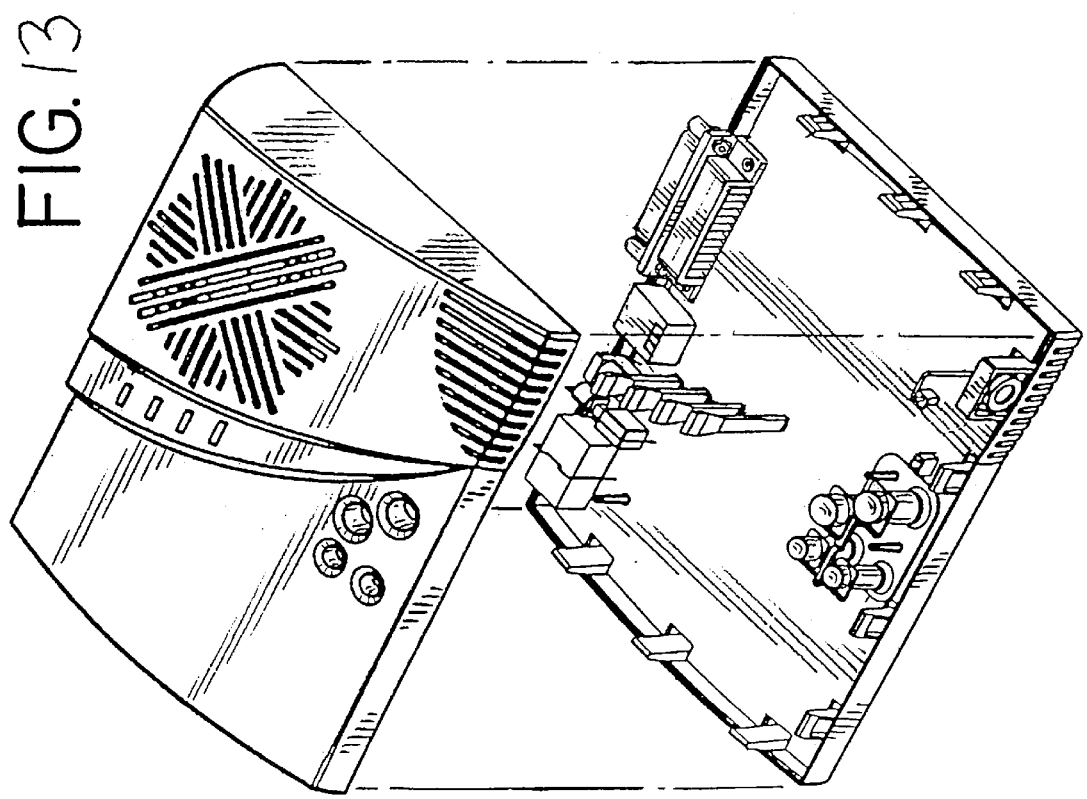
FIG. 13 is an exploded perspective view of the preferred embodiment showing the microphone in position on the bottom shell.

Referring to FIGS. 7–12, the orientation of the speaker assembly 16 and microphone assembly 17 are shown. As shown in FIG. 14, the microphone assembly 17 includes the microphone stand 50 and microphone 52. The microphone stand 50 is preferably made of a soft anti-vibration material to dampen vibrations and reduce feedback through the microphone. In a preferred embodiment, Santoprene, available from Monsanto, is used. Although preferably staked to the posts 34 extending from the upper shell 12, the speaker assembly 16 is shown resting on the bottom shell 14 in FIGS. 7–12 to better illustrate the orientation of the speaker assembly 16 in relation to the microphone assembly 17. The microphone stand 50 is preferably positioned upright or in a plane perpendicular to the bottom side 64 of the bottom shell 14. The speaker 24 is preferably positioned near the back end of the speaker assembly 16 and spaced apart from the microphone assembly 17. The microphone face 66 is preferably directed away from the speaker assembly 16. A uni-directional microphone may preferably be used to allow the reception of sound waves in front of and on the sides of the microphone. The sensitivity of the uni-directional microphone on the side opposite the face, is minimal. Accordingly, this orientation of the microphone assembly and speaker aids in reducing acoustic feedback. Preferably, the microphone 52 may be oriented in a plane substantially perpendicular to a line extending radially from the speaker 24 and substantially perpendicular to a plane which includes the rim 40 of the speaker 24.

Referring to FIGS. 14–20, a preferred embodiment of the microphone stand 50 includes an outer portion 54 and an inner portion 56, which is connected to the outer portion 54 by at least one thin web portion 55. One or more web portions 55 may be used to connect the inner portion 56 to the outer portion 54, and the web portion 55 preferably has a thickness as thin as structurally possible to support the inner portion 56. In the embodiment shown, four web portions 55 are used. The thin web connection helps reduce vibration. In the embodiment shown, the inner portion 56 includes a front opening 70 which is smaller than the rear opening 72. The microphone 52 may be inserted from the rear and may preferably be retained by tabs 60 formed around the periphery of the rear opening 72. The bottom of the outer portion 54 may preferably include at least one opening 62 which may be fitted onto a peg 75 extending from the bottom shell 14. As shown in the embodiment of FIG. 19, two openings 62 are oriented diagonally across from each other on the bottom of the outer portion 54 of the microphone stand 50 to interlock with two pegs 75. The web portion extending from the bottom of the inner portion 56 may aid in reinforcing the bottom of the outer portion, which is fitted onto the pegs 75.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A speaker assembly comprising:
    an upper lid including an opening formed therein and a ledge formed in a recessed area around the perimeter of the opening;
    a bottom cup attached to the upper lid;
    a speaker including a rim formed around the perimeter of the speaker, the speaker fitted within a chamber formed between the upper lid and bottom cup;
    a speaker gasket attached to the speaker rim, the gasket contacting the ledge and isolating the speaker from the upper lid; and
    a plurality of brackets extending from the bottom cup, a gasket attached to each bracket for isolating the speaker assembly from an outer shell.

2. The assembly of claim 1 wherein the speaker gasket attached to the speaker rim comprises a C-shaped gasket.

3. The assembly of claim 1 wherein each bracket gasket comprises a barrel-type gasket.

4. The assembly of claim 1 further comprising a foam insert fitting within the remaining space of the chamber and surrounding the speaker.

5. The assembly of claim 1 further comprising a cap positioned over the speaker rim gasket and within the opening formed in the upper lid to secure the speaker to the upper lid.

6. The assembly of claim 5 wherein the cap is ultra-sonically welded to the upper lid.

7. The assembly of claim 1 wherein the upper lid is ultra-sonically welded to the bottom cup.

8. The assembly of claim 1 wherein the bottom cup includes ribbing formed along an interior portion of the bottom cup.

9. A speaker-phone assembly comprising:
    an outer shell including a plurality of posts; and
    a speaker assembly including an upper lid attached to a bottom cup, the upper lid and bottom cup receiving a speaker, the speaker assembly including a plurality of brackets, a gasket attached to each bracket, each gasket including an opening which receives one of the posts to isolate the speaker from the outer shell.

10. The assembly of claim 9 further comprising a C-shaped gasket positioned around a rim of the speaker to isolate the speaker from the upper lid.

11. The assembly of claim 9 wherein the posts are ultra-sonically welded to the gaskets.

12. The assembly of claim 9 wherein the gaskets attached to the brackets comprise barrel-type gaskets.

13. The assembly of claim 9 wherein the outer shell comprises an upper shell and bottom shell, the upper shell including the posts.

14. The assembly of claim 9 wherein the upper lid is ultra-sonically welded to the bottom cup.

15. A method of isolating a speaker within a speaker-phone assembly comprising:
    providing a speaker assembly including a plurality of brackets, a gasket having an opening formed therein attached to each bracket;
    providing an outer shell including a plurality of interior posts formed therein;
    inserting the posts into the openings formed in the bracket gaskets; and
    ultrasonically welding the posts over the gaskets to secure the speaker assembly to the outer shell.

16. The method of claim 15 wherein the outer shell includes a upper shell and bottom shell, the posts formed on the interior of the upper shell, inserting the bracket gaskets on the posts to a position where the speaker assembly is not contacting the bottom shell.

17. The method of claim 15 further comprising a speaker having a rim, a C-shaped gasket positioned over the rim, isolating the speaker from the speaker assembly with the C-shaped gasket.

18. The method of claim 15 wherein the speaker assembly includes an upper lid and bottom cup, positioning a gasket between the upper lid and bottom cup.

19. The method of claim 18 further comprising positioning a thin foam gasket inserted between a top side of the lid and an interior wall of the outer housing.

20. The method of claim 15 further comprising positioning a speaker within the speaker assembly and surrounding the speaker with a foam insert which substantially conforms to the shape of an inner chamber formed within the speaker assembly.

21. The method of claim 15 further comprising:
    providing a microphone stand including an inner portion isolated from and connected to an outer portion by at least one narrow web portion;
    positioning a microphone within an opening formed in the inner portion;
    positioning the microphone stand within the outer shell; and
    dampening vibrations to the microphone by directing any vibration from the outer portion through the narrow web portion.

22. The method of claim 21 further comprising orienting a face of the microphone in a plane substantially perpendicular to a line radially extending from a speaker positioned within the speaker assembly.

23. A speaker-phone assembly comprising:
    a speaker assembly positioned within an outer shell, the outer shell including a plurality of posts, the speaker assembly including an upper lid attached to a bottom cup, the upper lid and bottom cup receiving a speaker, the speaker assembly including a plurality of brackets, a gasket attached to each bracket, each gasket including an opening which receives one of the posts to isolate the speaker from the outer shell;
    the speaker positioned in the speaker assembly;
    a microphone stand positioned upright on a bottom side of the outer shell; and
    a microphone positioned in the stand and having a face oriented in a plane substantially perpendicular to a plane which includes a rim of the speaker.

24. The assembly of claim 23 wherein the microphone stand includes an outer portion including a base, the base including at least one opening for receiving a peg, an inner portion including an opening for receiving a microphone, the inner portion connected to the outer portion by at least one web portion to allow the inner portion to be isolated from the outer portion except for the contact of the web portion.

25. The microphone stand of claim 24 wherein the stand comprises a soft resilient dampening material.

26. The microphone stand of claim 24 comprising a plurality of web portions.

27. The microphone stand of claim 26 wherein each of the web portions are equally spaced from each other about the perimeter of the inner portion.

28. The microphone stand of claim 24 wherein the inner portion has a circular shape.

29. The microphone stand of claim 24 wherein the outer portion has a square shape.

30. The microphone stand of claim 24 further comprising retaining tabs extending inward from the inner portion to retain the microphone positioned within the opening in the inner portion.

* * * * *